(No Model.)
T. C. BAITER.
SCORING MACHINE.
No. 452,631. Patented May 19, 1891.
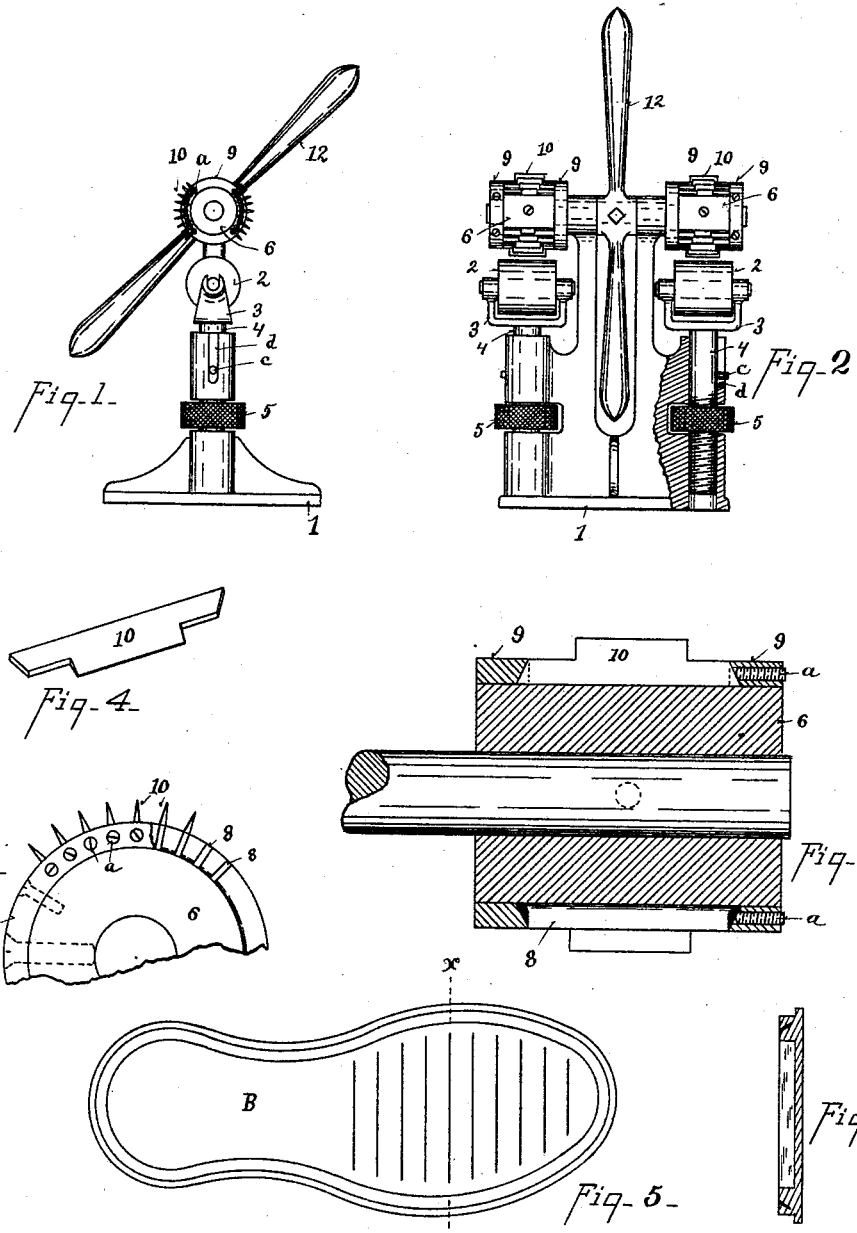
Witnesses
C. W. Miles
T. Simmons
Inventor
Theodore C. Baiter
By his Attorneys Wood & Boyd

UNITED STATES PATENT OFFICE.

THEODORE C. BAITER, OF CINCINNATI, OHIO.

SCORING-MACHINE.

SPECIFICATION forming part of Letters Patent No. 452,631, dated May 19, 1891.

Application filed September 26, 1890. Serial No. 366,242. (No model.)

*To all whom it may concern:*

Be it known that I, THEODORE C. BAITER, a citizen of the United States, and a resident of Cincinnati, in the county of Hamilton and State of Ohio, have invented certain new and useful Improvements in Scoring-Machines, of which the following is a specification.

The object of my invention is to provide a machine for scoring the inner or welt soles of boots or shoes, the various features of which will be fully set forth in the description of the accompanying drawings, making a part of this specification, in which—

Figure 1 is an end elevation of my improvement. Fig. 2 is a side elevation of the same, partly in section. Fig. 3 is a sectional elevation of one of the knife-cylinders. Fig. 4 is a plan view of one of the knives. Fig. 5 is a plan of the shoe-sole after it has been scored. Fig. 6 is a sectional end elevation of one of the scoring-knife rolls; and Fig. 7 is a sectional view taken on the line $x\ x$, Fig. 5.

In scoring welt-soles it is necessary to have a margin all around the outer edge of the sole, as shown in Fig. 5, and to score only the central part of the sole between the channels, and my device is primarily designed for this purpose.

1 represents the base of the machine. I have shown two independent sets of scoring-tools, each of which is the counterpart of the other.

2 represents supporting-rolls mounted upon a yoke-bearing 3.

4 represents a spindle to which the yoke 3 is attached. It is screw-threaded to receive the adjusting-nut 5 for turning up the spindle 4 to adjust the vertical height of the rolls 2.

6 represents a scoring-knife cylinder.

C represents a pin riding in slot $d$, which holds the rolls 2 in alignment with the scoring-rolls.

I have shown two sets of scoring-knives. The series of these knives are each individually held in grooves 8, as shown in Fig. 6.

9 represents collars or rings secured around the periphery of the rolls 6, so as to hold the knives in position.

10 represents one of the scoring-knives. It is provided with a shank which fits in one of the grooves 8 and slides in said grooves endwise. The rear end abuts against one of the collars, when the other collar is slipped on and secured to the other end. The ends of said collars are preferably beveled.

In order to secure the knives rigidly in position, I provide a series of screws $a$, passing endwise through the collar, the points of which screws bear against the beveled ends of the knives 10 and rigidly lock them in position. The scores to be cut in the sole, as shown in the plan view of the sole, Fig. 5, are required to be of varying lengths and to correspond with the varying width of the soles and different styles. It is important, therefore, to have the knives readily removable, so as to introduce different lengths of blades and to adjust them to the varying kinds of work required. By taking off one of the collars 9 the knives can readily be removed endwise out of the grooves and new ones inserted in position, so that any desired length of scoring may be made in a sole.

I have shown two sets of knives upon each scoring-roll. One may be adapted to a right and the other to a left hand sole, if desired, so that the operator can readily score both rights and lefts on one side of the machine.

I have shown the two sides of the machine as adapted for scoring, so that two or more different styles of scoring may be arranged on the said cylinders.

12 represents a handle for revolving said cylinders 6.

The mode of operating my machine is as follows: The rolls 2 are adjusted vertically by the nuts 5 to regulate the depth of cut which is to be made by the scoring-knives. The machine is turned so as to bring the first knife of the series in the proper position for inserting the sole B (shown in Fig. 5) between the knives and the supporting-rolls 2. The handle 12 is then turned, which carries the sole through and scores it successively. The motion of the handle is reversed and the sole is carried back and another introduced and treated in the same manner.

Having described my invention, what I claim is—

1. In a scoring-machine, a scoring-cylinder 6, carrying a series of removable and adjustable scoring-knives 10, of varying length, for producing separated scores of different length in the sole, in combination with a supporting-roll 2, substantially as described.

2. In a scoring-machine, the combination, with a supporting-roll 2, of a scoring-cylinder 6, having a series of slots 8, in which are inserted knives 10, and collars 9 for holding said knives in position, substantially as described.

3. In combination with a supporting-roll 2, the scoring-cylinder 6, provided with a series of grooves 8, the collars 9, having screws $a$ passing horizontally through the collars and abutting against the edge of the knives, substantially as specified.

4. In a scoring-machine, a scoring-cylinder 6, provided with a series of scoring-knives 10, of varying length, for producing separated scores of different length in a sole, in combination with the supporting-roll 2, mounted in vertical adjustable bearing, whereby the depth of cut may be regulated by adjusting said roll, substantially as described.

5. In a scoring-machine, the combination, with a supporting-roll 2, of a scoring-cylinder 6, provided with a series of knives 10 of less width than the roll and arranged in series to score the inner sole between the welt-channels, substantially as described.

In testimony whereof I have hereunto set my hand.

THEODORE C. BAITER.

Witnesses:
T. SIMMONS,
C. W. MILES.